United States Patent [19]

Mango

[11] Patent Number: 4,464,519

[45] Date of Patent: Aug. 7, 1984

[54] VINYL CHLORIDE-PROPYLENE COPOLYMERS HAVING INCREASED POROSITY

[75] Inventor: Phillip A. Mango, South Somerville, N.J.

[73] Assignee: Air Products and Chemicals, Inc., Allentown, Pa.

[21] Appl. No.: 386,147

[22] Filed: Jun. 7, 1982

[51] Int. Cl.³ .................. C08F 2/20; C08F 214/06
[52] U.S. Cl. .................. 526/200; 526/345; 526/344.2; 526/909
[58] Field of Search ........................ 526/200

[56] References Cited

U.S. PATENT DOCUMENTS

| | | | |
|---|---|---|---|
| 3,340,243 | 9/1967 | Beer et al. | 260/92.8 |
| 3,468,858 | 12/1964 | Heiberger et al. | 260/87.5 |
| 3,592,800 | 7/1971 | Oschmann et al. | 260/85.5 |
| 3,701,742 | 10/1972 | Richardson et al. | 260/17 R |
| 3,838,138 | 9/1974 | Langsam | 260/87.5 |
| 3,917,548 | 11/1975 | Harrington | 260/17 |
| 3,945,958 | 3/1976 | Koyanagi et al. | 260/17 |
| 3,957,744 | 5/1976 | Deuschel et al. | 526/73 |
| 4,000,355 | 12/1976 | May | 526/200 |
| 4,093,791 | 6/1978 | Bauer | 526/200 |
| 4,143,224 | 3/1979 | Klippert | 526/200 |
| 4,258,163 | 3/1981 | Mariasi et al. | 526/202 |
| 4,283,516 | 8/1981 | Peeples | 526/202 |
| 4,324,878 | 4/1982 | Biaggi et al. | 526/200 |
| 4,330,653 | 5/1982 | Klippert | 526/200 |

*Primary Examiner*—C. A. Henderson
*Attorney, Agent, or Firm*—Michael Leach; E. Eugene Innis; James C. Simmons

[57] ABSTRACT

Vinyl chloride-propylene copolymer resin having improved porosity as shown by an increased irreversible plasticizer take-up is produced by the suspension polymerization of vinyl chloride and propylene in the presence of a binary suspension system of a hydroxypropylmethyl cellulose having 19–30% methoxyl and 4–12% hydroxypropoxyl substitution and a 30–50 mole % hydrolyzed polyvinyl alcohol.

4 Claims, No Drawings

VINYL CHLORIDE-PROPYLENE COPOLYMERS HAVING INCREASED POROSITY

TECHNICAL FIELD

The invention relates to a method for making vinyl chloride-propylene copolymers using suspension polymerization techniques. More specifically, the invention relates to the suspension copolymerization of vinyl chloride and propylene to produce copolymer resin beads having a high porosity and consistent particle size.

BACKGROUND OF THE INVENTION

Vinyl chloride-propylene copolymer resins which are presently produced are relatively non-porous, having irreversible plasticizer takeup numbers (ASTM D3367) of 10-16%. Vinyl chloride-propylene resin having such a relatively low porosity was acceptable for uses such as battery casings and phonograph records. In addition, there were not any rigorous residual monomer requirements in effect until recently.

However, the use of vinyl chloride-propylene resins for making video disks requires high porosity resins. Furthermore, residual monomer requirements for government regulatory compliance, as well as for a non-restricted application of the product, are much more stringent than in the past. Therefore, a suspension system capable of producing relatively porous vinyl chloride-propylene resins is desirable.

U.S. Pat. No. 3,592,800 discloses the suspension polymerization of vinyl chloride in the presence of a conventional high molecular weight protective colloid, such as hydroxypropylmethyl cellulose, and a low molecular weight polyvinyl alcohol which is 66-98 mole % hydrolyzed. The polymer product is said to have improved absorption of plasticizer.

U.S. Pat. No. 3,957,744 discloses in Comparative Example E the polymerization of vinyl chloride in the presence of a hydroxypropylmethyl cellulose and a polyvinyl acetate which is 75 mole % saponified. The disclosure is directed to the suppression of reactor wall fouling.

U.S. Pat. No. 4,143,224 discloses a process for making vinyl chloride polymers, which have a high plasticizer uptake, in the presence of a mixture of suspending agents comprising (a) a partially acetylated polyvinyl alcohol having 5 to 20 wt.% acetate units, (b) a cellulosic material, and (c) a partially acetylated polyvinyl alcohol having 31 to 35 wt.% acetate units. Comparative Examples A and C disclose a binary suspending system for the homopolymerization of vinyl chloride comprising a hydroxypropylmethyl cellulose and a polyvinyl alcohol containing 22 wt.% acetate groups and 33 wt.% acetate groups, respectively.

U.S. Pat. No. 4,258,163 describes the polymerization of vinyl chloride using as a suspending system a known protective colloid such as hydroxymethyl cellulose and a particular partially saponified polyvinyl acetate with a degree of hydrolysis of 30 to 65 mole %.

U.S. Pat. No. 4,283,516 discloses the suspension polymerization of vinyl chloride using a polyvinyl alcohol having a hydrolysis level of 68 to 78% together with a hydroxypropyl cellulose. The suspension grade polyvinyl chloride resin is claimed to possess both high bulk density and excellent porosity.

Although several of the above references suggest that other vinyl comonomers may be present in the polymerization recipe, there are no examples showing the copolymerization of vinyl chloride and propylene.

Other patents which show binary suspending systems include U.S. Pat. Nos. 3,340,243; 3,701,742; 3,917,548; 3,945,958 and 4,000,355. U.S. Pat. No. 3,945,958 discloses in Example 7 the copolymerization of vinyl chloride and propylene in the presence of a methyl cellulose and either a hydroxypropyl cellulose or a hydroxypropylmethyl cellulose.

U.S. Pat. Nos. 3,468,858 and 3,838,138 teach the suspension copolymerization of vinyl chloride and propylene.

SUMMARY OF THE INVENTION

The invention provides a method for making vinyl chloride-propylene copolymer resins having improved porosity as demonstrated by an increased irreversible plasticizer take-up. The suspension polymerization of vinyl chloride and propylene is conducted using a binary suspension system comprising a water soluble suspending aid in combination with a monomer soluble suspending aid. The water soluble suspending aid is a hydroxypropylmethyl cellulose having about 19-30% methoxyl and about 4-12% hydroxypropoxyl substitution and a viscosity in the range of 30 to 60 cps as measured on a 2 wt.% aqueous solution at 20° C. on a Brookfield viscometer. The monomer soluble suspending aid is a polyvinyl alcohol having a degree of hydrolysis of about 30-50 mole %.

In addition to providing a vinyl chloride-propylene copolymer resin having an increased porosity, performing the copolymerization reaction in the presence of the binary suspending system of the invention affords copolymer resin of consistent particle size.

DETAILED DESCRIPTION OF THE INVENTION

The solubility of conventional suspending agents in a vinyl chloride-propylene monomer mix generally is very low, apparently lower than in vinyl chloride alone. It is believed that this lack of suspending aid solubility prevents any protection of the copolymer primary particles forming within a monomer mix droplet. With no protection the precipitating copolymer particles agglomerate and coalesce within the monomer mix droplet as they are formed yielding dense, highly packed, relatively non-porous beads. Using a monomer soluble suspending aid produces a porous bead, but the bead size is very inconsistent. It has been discovered that the proper combination of suspending aid types and concentration produces porous and consistent polymer beads.

The use of the binary suspending system of the invention produces a stable suspension of precipitating polymer particles within a liquid monomer mix droplet and a stable suspension of monomer mix droplets in an aqueous medium. A porous copolymer resin of consistent particle size is the result.

The invention is directed to the suspension copolymerization of a monomer mix comprising 0.5 to 20 wt% propylene with the rest being vinyl chloride using a binary suspension system comprising (a) a water soluble suspending aid which is a hydroxypropylmethyl cellulose having 19-30% methoxyl and 4-12% hydroxypropoxyl substitution in a concentration of from 0.03 to 0.10 wt% based on monomer, the cellulose suspending aid further having a viscosity ranging from 30 to 60 cps as a 2 wt% aqueous solution, and (b) a monomer soluble suspending aid which is a partially saponified polyvinyl alcohol being 30 to 50 mole % hydrolyzed in concentrations ranging from 0.01 to 0.10 wt% based on the monomer.

The degree of methoxyl and hydroxypropoxyl substitution is determined by the standard testing method ASTM D2363.

With regard to the hydroxypropylmethyl cellulose it is preferred that the methoxyl substitution be 19–25% and the viscosity be in the range of 30 to 40 cps, especially about 35 cps.

The vinyl chloride-propylene copolymers produced by the present invention contain about 88 to 99.8 wt% vinyl chloride and generally from 0.2 to 12 wt%, preferably 2 to 8 wt% propylene.

The suspension copolymerization procedures are those familiar to a worker skilled in the art as disclosed in U.S. Pat. Nos. 3,468,858 and 3,838,138 which are incorporated by reference.

The polymerization reaction can be effectively conducted under moderately elevated temperatures generally about 50° to 70° C. and pressures about 6 to 14 atm.

The method for making the porous vinyl chloride-propylene copolymers of the present invention is by suspension polymerization where the monomers are copolymerized in an aqueous system with the pH maintained at about 5 to 8.5, under constant agitation, in the presence of the dual suspending system comprising a hydroxypropylmethyl cellulose of 19 to 30% methoxyl and 4 to 12% hydroxypropoxyl substitution and a 30–50 mole % hydrolyzed polyvinyl alcohol. If the degree of alkoxyl substitution on the cellulose is less than the indicated values, the resultant product is relatively less porous. If the alkoxyl substitution is greater than that specified, the copolymer product has a very large and inconsistent bead size. If the partially hydrolyzed polyvinyl alcohol is less than 30% hydrolyzed, porosity is not improved, and if greater than 50% hydrolyzed, porosity is adversely affected.

In carrying out the polymerization operation an aqueous mixture containing from about 0.10 to about 0.50 wt% free radical initiator is charged into a reaction vessel capable of withstanding pressures up to 250 psi. The initiator may be incorporated into the reaction mixture in a single step, or alternatively, incrementally added as polymerization progresses. With incremental multiple addition a major amount may be used at the beginning of the cycle with aliquot portions of the balance being added during the cycle.

Free-radical catalysts conventionally used to initiate polymerization are suggested including, for example, aliphatic diacyl peroxides such as lauroyl peroxide and decanoyl peroxide; acylperoxycarbonic esters; peroxydicarbonates such as sec-butyl peroxydicarbonate and diisopropyl peroxydicarbonate; t-alkyl peresters of t-hydroperoxides such as t-butyl peroxyneodecanoate and t-butyl peroxypivalate; azo-nitrile catalysts, such as azo-bis-isobutyronitrile and the like. Such catalysts, when employed in an amount from about 0.1 or 0.15 to about 0.3% provide reactor cycle times of about 8 to 16 hours.

After dissolving the catalyst and the binary suspending system in the aqueous mixture, the pressure reaction vessel is capped and flushed with nitrogen followed by vinyl chloride monomer in the vapor form. Once agitation begins the vinyl chloride (liquid) and propylene (gas or liquid) monomers are introduced. The system is then brought to a reaction temperature from about 35° to 80° C. and, more optimally, from about 50° to 70° C. with constant agitation.

Under these conditions using the binary suspending system of the invention, the porosity of the resulting vinyl cloride-propylene copolymer resin can be greatly increased.

The following examples show that the binary suspension system of the invention when used for the homopolymerization of vinyl chloride yields a vinyl chloride resin with about a porosity increase ranging from 0 to 97% depending on the particular hydroxypropylmethyl cellulose while surprisingly yielding a vinyl chloride-propylene copolymer resin having a porosity increase comparably ranging from about 50 to about 150%. Such a dramatic increase in the porosity of the copolymer resin was totally unpredictable. To date the art has consistently shown that suspension systems have a lesser effect in porosity improvement in vinyl chloride copolymers compared to the homopolymer.

The porosity of the vinyl chloride polymers in the following examples was measured by the irreversible plasticizer take-up (IPTU) which is the grams of dioctyl phthalate (DOP) absorbed by 100 grams of polymer resin. The procedure for the measurement of IPTU values was ASTM D3367.

EXAMPLES 1–6

For Examples 1–6 a 3¼ gallon stainless steel reactor was charged with the following materials:

| Reaction Charge | |
|---|---|
| Distilled water ($N_2$ cooled) | 4500 g |
| Sodium bicarbonate | 0.4 g |
| Suspending aid (see Table 1) | |
| Vinyl chloride monomer (liquid) | 3000 g |
| t-Butyl peroxyneodecanoate | 15 g |

The first three ingredients were added to the reactor which was then capped and flushed with nitrogen followed by vinyl chloride vapor. the liquefied vinyl chloride was then added. After raising the reactor temperature to 55° C. and agitating the aqueous medium at 500 rpm, the initiator was forced into the reactor with about 150 to 250 g distilled water using nitrogen pressure. See Table 1 for the identity and quantity of water soluble hydroxypropylmethyl cellulose and monomer soluble polyvinyl alcohol used in each example.

TABLE 1

| | 1 | 2 | 3 | 4 | 5 | 6 |
|---|---|---|---|---|---|---|
| METHOCEL[d] E50 | 0.30 g | 0.30 g | — | — | — | — |
| METHOCEL F50 | — | — | 0.30 g | 0.30 g | — | — |
| METHOCEL K35 | — | — | — | — | 0.30 g | 0.30 g |
| POLIVIC S202[e] | — | 0.1 phm[f] | — | 0.1 phm[f] | — | 0.1 phm[f] |

TABLE 1-continued

| $IPTU \dfrac{g\ DOP}{100\ g\ polymer}$ | $25^a$ | $25^a$ | $22^b$ | $25^a$ | $14^c$ | $27.6^c$ |
|---|---|---|---|---|---|---|

[a] average of three batches
[b] average of two batches
[c] average of four batches
[d] METHOCEL is a trademark of cellulose ethers sold by Dow Chemical Co.
[e] POLIVIC S202 is a trademark for a 30-50 mole % hydrolyzed polyvinyl alcohol sold by Sigma Corp.
[f] phm = parts per hundred parts monomer

|  | METHOCEL E50 | METHOCEL F50 | METHOCEL K35 |
|---|---|---|---|
| Methoxyl % | 28–30 | 27–30 | 19–25 |
| Hydroxypropoxyl % | 7–12 | 4–7.5 | 4–12 |
| Viscosity of 2 wt % aqueous solution at 20° C. (cps) | 50 | 50 | 35 |

For the suspension polymerization of vinyl chloride homopolymer the data in Table 1 shows that the addition of a 30–50 mole % hydrolyzed polyvinyl alcohol (Polivic S202) as a monomer soluble suspending agent to the aqueous reaction medium in Example 2 did not yield a polyvinyl chloride resin having improved porosity over the homopolymer obtained from Example 1 containing only the water soluble Methocel E50 hydroxypropylmethyl cellulose.

The addition of Polivic S202 polyvinyl alcohol to the recipe of Example 3 which contained Methocel F50 cellulose ether gave polyvinyl chloride resin in Example 4 having an increased irreversible plasticizer take-up value of about 14%. When the monomer soluble polyvinyl alcohol was combined with Methocel K35 cellulose ether having a 19–25% methoxyl and 4–12% hydropropoxyl substitution, the resulting polyvinyl chloride resin averaged a 98% increase in porosity.

EXAMPLES 7–18

In Examples 7–18 the procedure for Examples 1–6 was followed except that 225 g of propylene was charged to the reactor after the vinyl chloride charge to provide a vinyl chloride-propylene copolymer containing about 4.5 wt% propylene. Table 2 gives the identity and quantity of the suspending agents used in each example.

The only suspending aid in Examples 7–11 was Methocel K35LV cellulose ether which provided a copolymer product having an average irreversible plasticizer take-up (IPTU) value of about 9.3. If Example 11 is regarded as an anomaly since its value was about 50% higher than the other four examples, the average irreversible plasticizer take-up value becomes only 8.3. A comparison of the vinyl chloride-propylene copolymer obtained from Examples 12 and 13 which used the Polivic S202 polyvinyl alcohol in combination with the Methocel K35LV cellulose shows that the porosity of the copolymer resin was increased by a surprisingly 140%, or 167% if Example 11 is discounted. Such a dramatic increase in porosity for the copolymer was completely unexpected in view of the 97% porosity improvement for the homopolymer shown in Example 6 and the generally accepted view that vinyl chloride copolymers demonstrate less of a porosity improvement than the homopolymer.

The copolymer resin prepared in the presence of Methocel F-50 cellulose ether and Polivic S202 polyvinyl alcohol in Examples 17 and 18 showed an average increase in porosity of about 50% over the copolymer resin prepared in the presence of only the cellulose ether suspending aid in Examples 14–16. The improvement demonstrated in the homopolymer case by adding Polivic S202 polymer in Example 4 was merely 14%.

As can be seen from Table 2 the particle size distribution of the vinyl chloride-propylene copolymer resin made in the presence of the binary suspension system of the invention was consistent.

STATEMENT OF INDUSTRIAL APPLICATION

The use of a binary suspension system comprising a hydroxypropylmethyl cellulose and a partially hydrolyzed polyvinyl alcohol in the suspension polymerization of a monomer mixture containing vinyl chloride and propylene affords the production of vinyl chloride-propylene copolymer beads having increased porosity for use in the manufacture of video disks.

I claim:

TABLE 2

|  | RUN | | | | | | | | | | | |
|---|---|---|---|---|---|---|---|---|---|---|---|---|
|  | 7 | 8 | 9 | 10 | 11 | 12 | 13 | 14 | 15 | 16 | 17 | 18 |
| METHOCEL K-35LV | 0.3 | 0.3 | 0.3 | 0.3 | 0.3 | 0.3 | 0.3 | — | — | — | — | — |
| METHOCEL F-50 | — | — | — | — | — | — | — | 0.3 | 0.3 | 0.3 | 0.3 | 0.3 |
| POLIVIC S202 | — | — | — | — | — | 0.2 | 0.2 | — | — | — | 0.2 | 0.2 |
| $IPTU \dfrac{g\ DOP}{100\ g\ polymer}$ | 8.0 | 8.0 | 9.2 | 8.0 | 13.2 | 22.4 | 22.0 | 8.0 | 8.0 | 12.0 | 12.0 | 16.0 |
| Particle Size Distribution | | | | | | | | | | | | |
| 20 | 0 | 0 | 0 | 0.2 | 0 | 0 | 0 | 0 | 0.1 | 0 | 0 | 0 |
| 30 | 0.1 | 0 | 0 | 0.2 | 0.1 | 0 | 0.1 | 0 | 0 | 0.3 | 0 | 0 |
| 40 | 0.1 | 0.3 | 0.1 | 0.4 | 0.1 | 0.2 | 0.2 | 0 | 0.1 | 1.4 | 0 | 0 |
| 60 | 4.3 | 8.2 | 7.0 | 7.6 | 5.2 | 3.0 | 1.8 | 8.8 | 7.1 | 14.6 | 0.4 | 2.3 |
| 80 | 14.5 | 13.2 | 13.5 | 16.3 | 16.9 | 10.0 | 7.3 | 14.0 | 14.4 | 15.0 | 10.1 | 10.3 |
| 100 | 11.0 | 10.7 | 11.8 | 11.4 | 15.0 | 15.1 | 14.2 | 8.2 | 11.1 | 5.2 | 13.3 | 8.9 |
| 140 | 13.9 | 14.1 | 14.0 | 9.8 | 10.0 | 15.0 | 18.3 | 11.7 | 12.4 | 7.3 | 17.2 | 12.8 |
| 170 | 3.8 | 2.4 | 2.4 | 2.6 | 1.7 | 3.7 | 4.8 | 3.8 | 2.7 | 3.3 | 5.5 | 7.2 |
| 200 | 1.4 | 0.6 | 0.8 | 0.9 | 0.5 | 1.5 | 2.0 | 1.8 | 0.9 | 1.7 | 2.3 | 4.5 |
| PAN | 0.9 | 0.5 | 0.4 | 0.7 | 0.5 | 1.5 | 1.3 | 1.6 | 1.0 | 1.2 | 1.2 | 4.0 |

1. In the suspension copolymerization of vinyl chloride and propylene, the method for producing vinyl chloride-propylene copolymer resin containing 88 to 99.8 wt% vinyl chloride and 0.2 to 12 wt% propylene and having improved porosity as demonstrated by an increased irreversible plasticizer take-up which method comprises conducting the suspension polymerization reaction using a suspension system comprising a hydroxypropylmethyl cellulose having 19-30% methoxyl and 4-12% hydroxypropoxyl substitution and a viscosity in the range of 30 to 60 cps as measured on a 2 wt% aqueous solution at 20° C., and a 30-50 mole % hydrolyzed polyvinyl alcohol, the hydroxypropylmethyl cellulose concentration is from 0.03 to 0.10 wt% and the polyvinyl alcohol concentration is from 0.01 to 0.10 wt%, based on monomer.

2. The method of claim 1 wherein the hydroxypropylmethyl cellulose has a 19-25% methoxyl substitution and a viscosity in the range of 30 to 40 cps.

3. The method of claim 2 wherein the viscosity is about 35 cps.

4. In a copolymerization process comprising the aqueous suspension copolymerization of a monomer mix which is 80 to 99.5 wt% vinyl chloride and 0.5 to 20 wt% propylene, the method for producing a vinyl chloride-propylene copolymer resin having improved porosity which comprises performing the aqueous suspension copolymerization reaction using a suspension system comprising a hydroxypropylmethyl cellulose having 19-30% methoxyl and 4-12% hydroxypropoxyl substitution and a viscosity in the range of 30 to 60 cps as measured on a 2 wt% aqueous solution at 20° C., and a 30 to 50 mole % hydrolyzed polyvinyl alcohol, the hydroxypropylmethyl cellulose amount is from 0.03 to 0.10 wt% and the polyvinyl alcohol amount is from 0.01 to 0.10 wt%, based on monomer.

* * * * *